United States Patent
Iso et al.

(10) Patent No.: US 6,352,961 B1
(45) Date of Patent: Mar. 5, 2002

(54) GREASE COMPOSITION FOR ROLLING BEARING

(75) Inventors: Kenichi Iso; Atushi Yokouchi; Hideki Koizumi; Michiharu Naka, all of Kanagawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/270,515
(22) Filed: Mar. 17, 1999

(30) Foreign Application Priority Data

Feb. 23, 1998 (JP) .......................................... 10-074406

(51) Int. Cl.$^7$ ...................... C10L 103/06; C10L 115/08; C10L 135/18
(52) U.S. Cl. ...................... 508/155; 508/364; 508/552
(58) Field of Search .................................. 508/154, 371, 508/552, 364

(56) References Cited

U.S. PATENT DOCUMENTS 5,512,188 A * 4/1996 Kinoshita .................... 508/155
5,840,666 A * 11/1998 Yokouchi .................... 508/107

* cited by examiner

*Primary Examiner*—Margaret Medley
*Assistant Examiner*—Cephia D. Toomer
(74) *Attorney, Agent, or Firm*—Sughrue Mion, PLLC

(57) ABSTRACT

The present invention provides a grease composition which is excellent in peel resistance, not to mention lubricity, as compared with the prior art products. A novel grease composition for rolling bearing is provided, comprising a base oil, an extender, an inorganic compound-based filler having an average particle diameter of not more than 2 μm and zinc dithiocarbamate.

15 Claims, 2 Drawing Sheets

GREASE COMPOSITION FOR ROLLING BEARING

FIELD OF THE INVENTION

The present invention relates to a grease composition for rolling bearing. More particularly, the present invention relates to a grease composition for rolling bearing having an improved peeling resistance suitable for rolling bearings mounted in automobile electrical parts or engine auxiliary machinery such as alternator, solenoid clutch for car air conditioner, interpulley, electric fan motor and water pump.

BACKGROUND OF THE INVENTION

In general, the rotary portion of various power plants of automobile engine such as automobile electrical parts and engine auxiliary machinery, e.g., alternator, solenoid clutch for car air conditioner, interpulley, electric fan motor and water pump is provided with a rolling bearing which is lubricated mostly with a grease.

Due to the spread of FF cars, i.e., front wheel drive cars with the engine in the front which are intended for the reduction of size and weight, and the requirement for the enlargement of room, automobiles have been compelled to reduce the space of engine room. Thus, the reduction of the size and weight of electrical parts and engine auxiliary machinery as mentioned above has been accelerated. In addition, the foregoing various parts have been further required of higher performance and higher output.

However, the reduction of size unavoidably causes an output drop. For example, alternator or solenoid clutch for car air conditioner has been designed to operate at a higher speed to compensate for output loss. At the same time, interpulley has been designed to operate at a higher speed. Further, the requirement for reduction of noise has promoted the design of closed engine room accompanied by the rise in the temperature in the engine room. Thus, the foregoing various parts must withstand high temperatures more than ever.

On the other hand, the grease for use in rolling bearing for automobile has been heretofore been given requirements mainly concerning lubricity such as prolonged life of bearing lubrication, little grease leakage, excellent low temperature performance, excellent rust-proofing properties and excellent bearing acoustic properties. However, the foregoing trend towards higher speed operation or higher performance has caused new problems. In some detail, a high load is periodically applied to the bearing surface of a rolling bearing, causing premature peeling on the running surface of the bearing. The development of a grease for preventing such a problem has been under way. As a long-lived grease for high speed rolling bearing intended for the prevention of premature peeling there is disclosed a grease composition comprising as an extender (i.e., a thickening agent) a diurea compound mainly terminated by an aromatic hydrocarbon group in JP-A-5-98280 (The term "JP-A" as used herein means an "unexamined published Japanese patent application"), JP-A-5-194979 and JP-A-5-263091.

As mentioned above, the prior art grease composition has comprised a properly selected extender (i.e., a thickening agent) to exhibit an improved peel resistance. However, there is a limit in the improvement of peel resistance attained by the selection of extender alone. Thus, the prior art grease composition cannot meet the demand for further improvement of peel resistance.

SUMMARY OF THE INVENTION

It is therefore an object of the present invention to provide a grease composition which is excellent in peel resistance, not to mention lubricity, as compared with the prior art products.

The foregoing object of the present invention will become more apparent from the following detailed description and examples.

The inventors made extensive studies of the mechanism of occurrence of peeling. As a result, it was considered that peeling occurs due to a synergistic effect of rise in the load caused by resonance of bearing, etc. and bending stress developed by the deformation of outer ring while the prolongation of the life of bearing against peeling by the use of a grease is attributed to a damping effect exerted by a grease film sufficiently retained on the rolling body and bearing surface resulting in the reduction of the vibration level during resonance or the maximum load on the rolling body (see "NSK Technical Journal", No. 656, page 1, 1993). The inventors then made further studies paying their attention to the fact that the effect of preventing peeling can be improved by enhancing the damping effect of grease film. As a result, it was found effective to strengthen the gel structure formed by an extender in order to enhance the grease-forming capacity of a grease film and hence enhance the damping effect against impact load. It was further found that as a means for strengthening the gel structure there is effectively employed a method involving the combined use of an inorganic compound filer and a specific organic zinc compound.

The present invention has been worked out on the basis of the foregoing knowledge. In other words, the foregoing object of the present invention is accomplished with a grease composition for rolling bearing comprising a base oil, an extender (i.e., a thickening agent), an inorganic compound-based filler and zinc dithiocarbamate wherein said inorganic compound-based filler has an average particle diameter of not more than 2 µm and comprises at least one material selected from the group consisting of particulate materials made of metal oxides, metal hydroxides, metal carbonates, hydrates thereof, metal nitrides, metal carbides, (synthetic) clay minerals, diamond, and solid lubricants.

BRIEF DESCRIPTION OF THE DRAWINGS

By way of example and to make the description more clear, reference is made to the accompanying drawings in which.

DETAILED DESCRIPTION OF THE INVENTION

Figure 1:
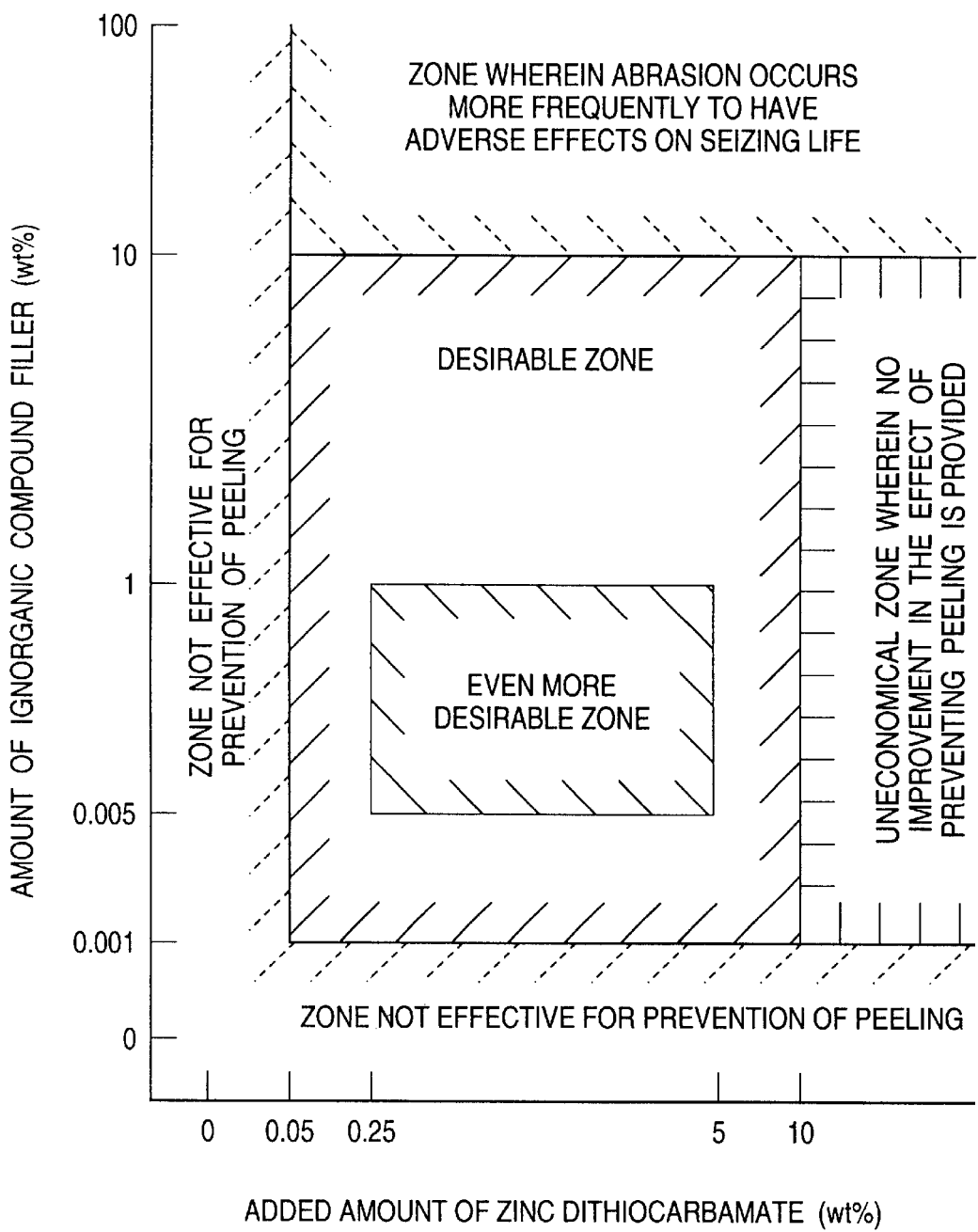
FIG. 1 is a graph illustrating the relationship between the concentration of zinc dithiocarbamate and the added amount of inorganic compound filler wherein a zone effective for the prevention of peeling and prolongation of seizing life is shown.

The grease composition for rolling bearing of the present invention will be further described hereinafter.

[Inorganic Compound Filler]

(Kind)

As mentioned above, the inorganic compound filler may be any material which can strengthen the gel structure formed by an extender and thus is not specifically limited. In practice, however, a compound which exerts an extending effect itself is preferably used to exert an enhanced strengthening effect.

Specific examples of such an inorganic compound filler include particulate materials made of metal oxides such as $SiO_2$, $Al_2O_3$, MgO, $TiO_2$, PZT and ZnO, metal hydroxides such as $Mg(OH)_2$, $Al(OH)_3$ and $Ca(OH)_2$, metal carbonates such as $MgCO_3$ and $CaCO_3$, hydrates thereof, metal nitrides such as $Si_3N_4$, ZrN, CrN and TiAlN, metal carbides such as SiC, TiC and WC, (synthetic) clay minerals such as bentonite, scmetite and mica, diamond, etc. Further examples of such an inorganic compound filler include particulate materials made of solid lubricants such as $MOS_2$, graphite, BN and $WS_2$.

In order to improve the affinity for the base oil or extender described later, the surface of the inorganic compound filler to be used herein may be modified hydrophilic. Preferred among the foregoing inorganic compounds are particulate materials made of metal oxides or clay minerals which exert an extending effect themselves.

(Particle Diameter)

The foregoing inorganic compound filler to be used herein has a particle diameter such that no troubles occur even when used and enclosed in a rolling bearing. In a rolling bearing, particles having a size of greater than 2 $\mu$m normally act as foreign matters (foreign particles), and hard particles accelerate the abrasion of the bearing surface or rolling body surface, causing premature damage of the bearing. These particles may occasionally deteriorate the bearing acoustic characteristics. Thus, if the average particle diameter of the inorganic compound filler exceeds 2 $\mu$m, the proportion of particles having a diameter of greater than 2 $\mu$m is raised to disadvantage. Further, taking into account the lubrication life of bearing, the particle diameter of the inorganic compound filler to be used herein is preferably smaller than the thickness of the film of base oil. Since the thickness of the oil film under practical working conditions is about 0.2 $\mu$m, the particle diameter of the inorganic compound filler is more preferably not more than 0.2 $\mu$m.

Accordingly, the inorganic compound filler to be incorporated in the grease composition for rolling bearing of the present invention preferably has an average particle diameter of not more than 2 $\mu$m, particularly not more than 0.2 $\mu$m.

The shape of the particulate inorganic compound filler is preferably close to sphere. In practice, however, the particulate inorganic compound filler may be in the form of polyhedron (cube or pallallelopidron) or needle in an extreme case if it has an average particle diameter falling within the above defined range.

(Concentration)

The content of the foregoing inorganic compound filler is preferably from 0.001% by weight (1 ppm) to 10% by weight based on the total weight of the grease used. If the content of the foregoing inorganic compound filler falls below the above defined range, the resulting effect of strengthening the gel structure formed by an extender is not sufficient. On the contrary, if the content of the foregoing inorganic compound filler exceeds the above defined range, the number of the foregoing filler particles is excessive, causing an increased abrasion that possibly has an adverse effect on the life against seizing.

In order to further secure the strengthening effect and take an adverse effect on the life against seizing into account, the content of the foregoing inorganic compound filler is preferably from 0.005 to 1% by weight.

[Zinc Dithiocarbamate]

(Kind)

The zinc dithiocarbamate to be used herein may be any material which further enhances the effect of preventing peeling and thus is not specifically limited. In practice, however, a compound represented by the following formula (1) may be used:

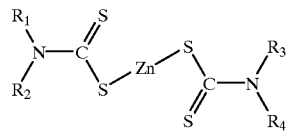

(1)

wherein $R_1$ to $R_4$, each represents a $C_{1-18}$, preferably $C_{1-13}$, more preferably $C_{3-8}$ hydrocarbon group. Examples of the hydrocarbon group represented by $R_1$ to $R_4$ include alkyl group, alkenyl group, aryl group, alkaryl group, and aralkyl group. In particular, the alkyl group can provide an excellent effect of preventing premature peeling.

Specific examples of zinc dithiocarbamates which can be preferably used include zinc dimethyldithiocarbamate, zinc diethyldithiocarbamate, zinc dipropyldithiocarbamate, zinc dibutyldithiocarbamate, zinc dipentyldithiocarbamate, zinc dihexyldithiocarbamate, zinc diheptyldithiocarbamate, zinc dioctyldithiocarbamate, zinc dinonyldithiocarbamate, zinc didecyldithiocarbamate, zinc diundecyldithiocarbamate, zinc didodecyldithiocarbamate, zinc ditridecyldithiocarbamate, and mixtures thereof.

(Concentration)

The content of the foregoing zinc dithiocarbamate is preferably from 0.05 to 10% by weight based on the total weight of the grease used. Zinc dithiocarbamates are occasionally available commercially in a form diluted with a mineral oil or kerosine. In this case, the content of the foregoing zinc dithiocarbamate indicates the content of the effective component thereof. If the content of the foregoing zinc dithiocarbamate falls below the above defined range, the resulting effect of preventing peeling is not sufficient, possibly causing premature peeling. On the contrary, even if the content of the foregoing zinc dithiocarbamate exceeds the above defined range, it no longer enhances the effect of preventing peeling and thus is not economical.

In order to assure prolonged life against peeling and take lubrication life into account, the content of the zinc dithiocarbamate is preferably from 0.25 to 5% by weight based on the total weight of the grease used.

[Extender]

The extender to be used herein is not specifically limited so far as it can form a gel structure in which the base oil can be retained. For example, the extender to be used herein may be properly selected from the group consisting of metallic soaps such as metallic soap made of Li, Na, etc. and composite metallic soap made of materials selected from Li, Na, Ba, Ca, etc., and non-soap compounds such as bentone, silica gel, urea compound, urea-urethane compound and urethane compound. Taking into account the heat resistance of the grease used, urea compound, urea-urethane compound, urethane compound or mixtures thereof are preferred. Specific examples of the urea compound, urea-urethane compound and urethane compound include diurea compound, triurea compound, tetraurea compound, polyurea compound, urea-urethane compound, diurethane compound, and mixtures thereof. Preferred among these compounds are diurea compound, urea-urethane compound, diurethane compound, and mixtures thereof. More preferably, diurea compounds represented by the following formulae (2) to (4) are blended:

$$R_5-NHCNH-R_6-NHCNH-R_5 \quad (2)$$

$$R_5-NHCNH-R_6-NHCNH-R_7 \quad (3)$$

$$R_7-NHCNH-R_6-NHCNH-R_7 \quad (4)$$

wherein $R_5$ represents a $C_{6-12}$ aromatic ring-containing hydrocarbon group; $R_6$ represents a $C_{6-15}$ divalent aromatic ring-containing hydrocarbon group; and $R_7$ represents a cyclohexyl group or $C_{7-12}$ alkylcyclohexyl group.

The foregoing diurea compound can be obtained by reacting 1 mol of diisocyanate as $R_6$ component with a total of 2 mols of monoamine as $R_5$ or $R_7$ component. In this manner, the diurea compound is obtained in the form of mixture of compounds represented by the foregoing general formulae (2) to (4). In the mixture of diurea compounds, the proportion of the number of $R_5$ in the total number of $R_5$ and $R_7$, i.e., (mols of $R_5$/(mols of $R_5$+mols of $R_7$)) is preferably from 0.10 to 0.95, more preferably from 0.20 to 0.85. If this value falls below 0.10, the resulting grease leakage resistance is not sufficient. On the contrary, if this value exceeds 0.95, the resulting compound exhibits a deteriorated fluidity that possibly causes seizing.

Specific examples of the group represented by $R_5$ include toluil group, xylyl group, β-fenchyl group, t-butylphenyl group, dodecylphenyl group, benzyl group, and methylbenzyl group.

Specific examples of the group represented by $R_6$ which can be preferably used will be given below.

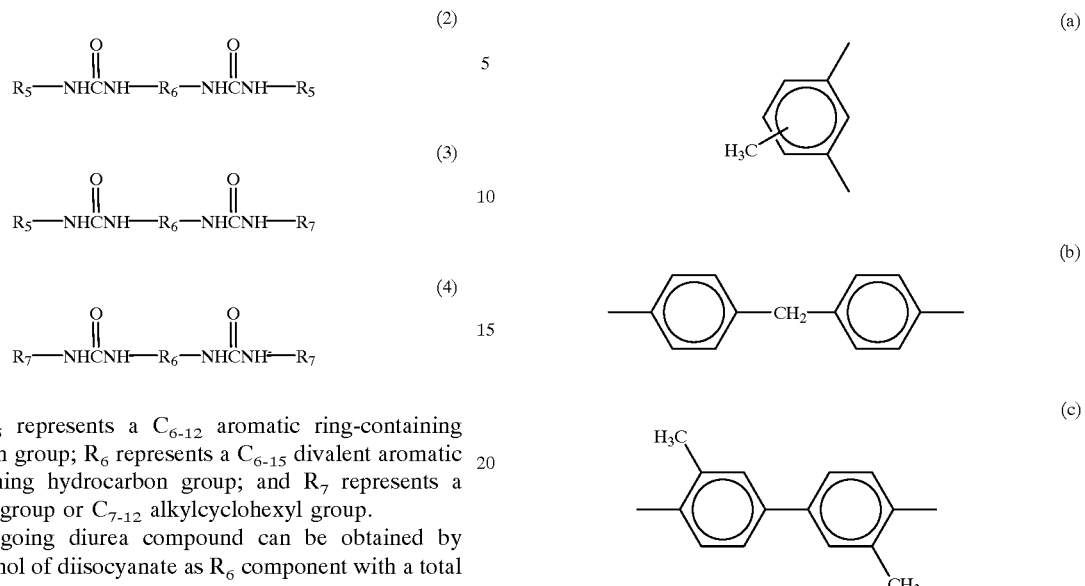

Specific examples of the group represented by $R_7$ include cyclohexyl group, methylcyclohexyl group, dimethyl cyclohexyl group, ethylcyclohexyl group, diethylcyclohexyl group, propylcyclohexyl group, isopropylcyclohexyl group, 1-methyl-3-propylcyclohexyl group, butylcyclohexyl group, pentylcyclohexyl group, pentylmethylcyclohexyl group, and hexylcyclohexyl group. Particularly preferred among these groups are cylohexyl group and $C_{7-8}$ alkylcyclohexyl group such as methylcylohexyl group and ethylcyclohexyl group.

Specific examples of the diurea compounds represented by the foregoing formulae (2) to (4) which can be preferably used will be given below:

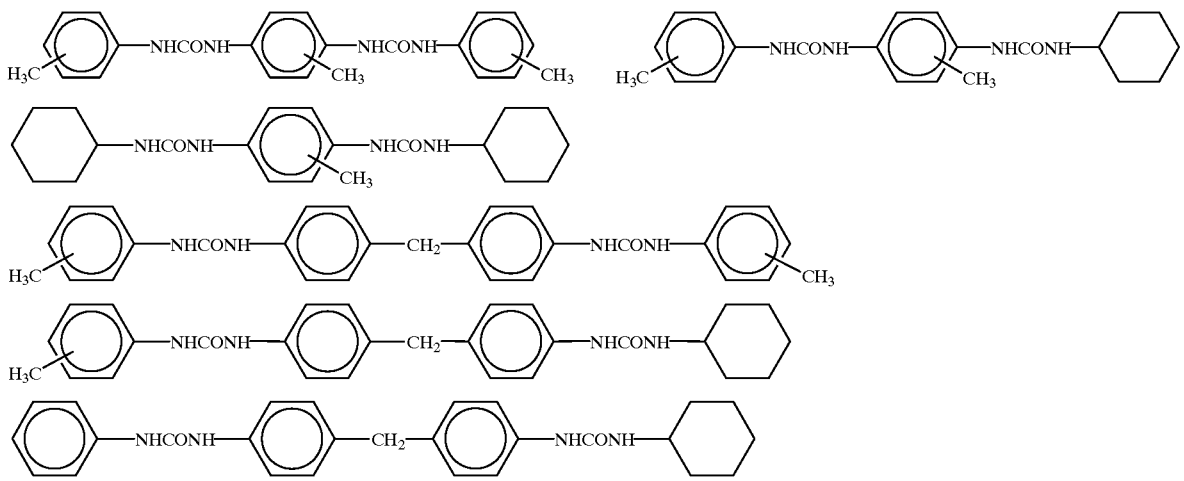

(Concentration)

The content of the foregoing extender is from 9 to 38% by weight, preferably from 13 to 30% by weight based on the total weight of the grease used. If the content of the extender falls below 9% by weight, the resulting gel-forming capacity is not sufficient, making it impossible to obtain a sufficient hardness or increasing the occurrence of grease leakage. On the contrary, if the content of the extender exceeds 38% by weight, the resulting grease exhibits a remarkably deteriorated durability life at high temperatures and high speed.

[Base Oil]

The base oil to be used herein is not specifically limited. Any oils which are commonly used as base oil for lubricant may be used. In order to avoid the generation of noise during actuation at low temperatures due to lack of low temperature fluidity or the occurrence of seizing due to difficulty in formation of oil film at high temperatures, it is preferred to use a base oil having a 40° C. dynamic viscosity of preferably from 10 to 400 mm$^2$/sec, more preferably from 20 to 250 mm$^2$/sec, even more preferably from 40 to 150 mm$^2$/sec.

Specific examples of the base oil employable herein include mineral oil-based lubricant, synthetic oil-based lubricant, and natural oil-based lubricant. Examples of the foregoing mineral oil-based lubricant include those obtained by subjecting mineral oil to purification by distillation under reduced pressure, lubricant deasphalting, solvent extraction, decomposition by hydration, solvent dewaxing, washing with sulfuric acid, purification with clay, purification by hydrogenation, etc. in proper combination.

Examples of the foregoing synthetic oil-based lubricant include aliphatic hydrocarbon oil, aromatic hydrocarbon oil, ester oil, and ether oil. Examples of the foregoing aliphatic hydrocarbon oil include normal paraffin, isoparaffin, polybutene, polyisobutylene, 1-decene oligomer, poly-α-olefin obtained by polymerization of 1-decene with ethylene oligomer, and hydrogenation products thereof.

Examples of the foregoing aromatic hydrocarbon oil include alkylbenzenes such as monoalkylbenzene and dialkylbenzene, and alkylnaphthalenes such as monoalkylnaphthalene, dialkylnaphthalene and polyalkylnapthalene. Examples of the foregoing ester oil include diester oils such as dibutyl sebacate, di-2-ethylhexyl sebacate, dioctyl adipate, diisodecyl adipate, ditridecyl adipate, ditridecyl glutarate and methyl acetyl cinnolate, aromatic ester oils such as trioctyl trimellitate, tridecyl trimellitate and tetraoctyl pyromellitate, polyol ester oils such as trimethylol propane caprylate, trimethylol propane pelargonate, pentaerythritol-2-ethyl hexanoate and pentaerythritol pelargonate, and complex ester oils as oligo ester of polyvalent alcohol with a mixed fatty acid of dibasic acid and monobasic acid.

Examples of the foregoing ether oil include polyglycols such as polyethylene glycol, polypropylene glycol, polyethylene glycol monoether and polypropylene glycol monoether, and phenyl ether oils such as monoalkyl triphenyl ether, alkyl diphehyl ether, dialkyl diphenyl ether, pentaphenyl ether, tetraphenyl ether, monoalkyl tetraphenyl ether, and dialkyl tetraphenyl ether.

Other examples of the synthetic lubricant-based base oil include tricresyl phosphate, silicone oil, and perfluoroalkyl ether.

Examples of the foregoing natural oil-based lubricant include fats and fatty oils such as beef tallow, lard, soybean oil, rape seed oil, rice bran oil, coconut oil, palm oil and palm seed oil, and hydrogenation products thereof.

These base oils may be used singly or in admixture. These base oils may be adjusted to the foregoing desired dynamic viscosity.

[Other additives]

The grease composition for rolling bearing of the present invention may comprise know additives incorporated therein as necessary to further improve its properties.

Examples of these additives include gelatinizing agents such as metallic soap, bentone and silica gel, oxidation inhibitors such as amine compound, phenol compound, sulfur-based compound and zinc dithiophosphate, extreme-pressure additives such as chlorine-based compound, sulfur based compound, phosphor-based compound, zinc dithiophosphate and organic molybdenum compound, oily agents such as aliphatic acid, animal oil and vegetable oil, rust preventives such as petroleum sulfonate, dinonylnaphthalenesulfonate and sorbitan ester, metal inactivating agents such as benzotriazole and sodium nitrite, and viscosity index improvers such as polymethacrylate, polyisobutylene and polystyrene. These additives may be used singly or in combination. The added amount of these additives is not specifically limited so far as the desired object of the present invention can be accomplished. In practice, however, it is preferably not more than 20% by weight based on the total weight of the grease used.

[Preparation Process]

The process for the preparation of the grease composition for rolling bearing of the present invention is not specifically limited. In practice, however, the grease composition for rolling bearing of the present invention can be obtained by reacting an extender in a base oil. The inorganic compound filler and the zinc dithiocarbamate are preferably blended in a predetermined amount during the foregoing reaction. Alternatively, a grease composition which has been previously prepared from an extender may then be mixed with the inorganic compound filler and the zinc dithiocarbamate. However, the mixture of the grease composition with the inorganic compound filler and the zinc dithiocarbamate thus prepared needs to be thoroughly stirred by means of a kneader, roll mill or the like to obtain a uniform dispersion. This processing may be effected under heating.

In the foregoing preparation process, additives other than the inorganic compound filler and zinc dithiocarbamate are preferably added at the same time with the inorganic compound filler and zinc dithiocarbamate from the standpoint of process efficiency.

EXAMPLE

The present invention will be further described in the following examples, but the present invention should not be construed as being limited thereto.

(Preparation of Grease)

The formulation of the extender, base oil, inorganic compound filler and zinc dithiocarbamate used in the examples of the present invention and the comparative examples are shown in Tables 1 to 4 below. In Table 1, TDI stands for tolylene diisocyanate, and MDI stands for 4,4'- diphenylmethane diisocyanate. The urea compound is obtained by reacting diisocyanate shown in Table 1 in an amount of 1 mol with monoamines shown in Table 1 in a total amount of 2 mols. In Table 3, the average particle diameters of the inorganic compound filler of the kind 1 (MgO), the inorganic compound filler of the kind 2 (MgO) and the inorganic compound filler of the kind 3 ($Al_2O_3$) are 50 nm, 200 nm and 13 nm, respectively.

These extenders, inorganic compound fillers, zinc dithiocarbamates and base oils were then used in various formulations shown in Table 5 to prepare various grease compositions. In some detail, the total blended amount of the extender, inorganic compound filler, zinc dithiocarbamate and base oil was 920 g. To the blend were added 50 g of an amine oxidation inhibitor and 30 g of a sulfonate-based rust preventive to prepare a grease composition having a total weight of 1,000 g. The preparation process will be further described hereinafter.

In some detail, a base oil mixed with diisocyanate and a base oil mixed with monoamine were reacted, and then heated with stirring to obtain a semisolid matter. To the semisolid matter was then added an amine-based oxidation inhibitor which had previously been dissolved in a base oil. The mixture was thoroughly stirred, and then allowed to cool. To the mixture was then added a sulfonate-based rust preventive. The mixture was then passed through a roll mill to obtain a base grease. To the base grease thus obtained were then added an inorganic compound filler and a zinc dithiocarbamate in a predetermined amount as shown in Table 5. The mixture was then thoroughly kneaded to obtain a grease composition.

(Rapid Acceleration and Deceleration Test)

The grease compositions thus obtained were then subjected to the following test to evaluate their peeling resistance. The results are shown in Table 5.

In some detail, a single row deep groove ball bearing (inner diameter: 17 mmφ; outer diameter: 47 mmφ; width: 14 mm) having 2.36 of each of the foregoing grease composition specimens enclosed therein was mounted into an alternator. In this arrangement, the bearing was then continuously operated at an engine rotary speed ranging from 1,000 to 6,000 rpm (bearing rotary speed: 2,400 to 13,300 rpm) at room temperature and a pulley load of 160 kgf. When the bearing surface of the outer ring underwent peeling that caused vibration, the test was then terminated. The testing time which had passed so far was measured. The maximum allowable operating time of the grease compositions of the various examples and other comparative examples were then evaluated relative to that of the grease composition of Comparative Example 1 as 1.

TABLE 1

| Extender | | | | | | | | | |
|---|---|---|---|---|---|---|---|---|---|
| | | Formulation | | | | | | | |
| Formulation of extender | | 1 | 2 | 3 | 4 | 5 | 6 | 7 | 8 |
| Diisocyanate | TDI | | 1.0 | | | 1.0 | 1.0 | | |
| | MDI | 1.0 | | 1.0 | 1.0 | | | 1.0 | 1.0 |
| Monoamine | p-Toluidine | 1.0 | 1.7 | | 1.9 | 0.2 | | 2.0 | |
| | Aniline | | | 0.4 | | | | | |
| | Cyclohexylamine | 1.0 | 0.3 | 1.6 | 0.1 | 1.8 | 2.0 | | 1.0 |
| | Stearylamine | | | | | | | | 1.0 |

TABLE 2

| Kind of base oil | | |
|---|---|---|
| Kind | Composition | Dynamic viscosity of base oil ($mm^2$/sec, 40° C.) |
| Kind 1 | Poly-α-olefin | 50 |
| Kind 2 | Dialkyl diphenyl ether | 100 |

TABLE 3

| Inorganic compound filler | | | |
|---|---|---|---|
| Kind | Composition | Trade name | Maker |
| Kind 1 | MgO | Type 500A high purity ultraparticulate magnesia | Ube Materials Co., Ltd. |
| Kind 2 | MgO | Type 2000A high purity ultraparticulate magnesia | Ube Materials Co., Ltd. |
| Kind 3 | $Al_2O_3$ | Aluminum oxide C | Nippon Aerosil Co., Ltd. |

TABLE 4

| Zinc dithiocarbamate | | | |
|---|---|---|---|
| Kind | Component | Structure | Proportion |
| Kind 1 | Zinc dithiocarbamate | 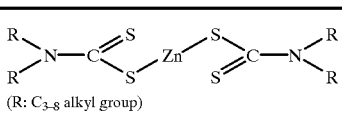 (R: $C_{3-8}$ alkyl group) | 50% by weight |
| | Diluted oil | Mineral oil-based lubricant | 50% by weight |

TABLE 5

| | Example No. | | | | | | | |
|---|---|---|---|---|---|---|---|---|
| | 1 | 2 | 3 | 4 | 5 | 6 | 7 | 8 |
| Extender composition | Formulation 1 | Formulation 2 | Formulation 3 | Formulation 4 | Formulation 5 | Formulation 6 | Formulation 7 | Formulation 8 |
| Amount of extender (wt %) | 20 | 30 | 13 | 9 | 38 | 20 | 29 | 15 |
| Kind of base oil | Kind 1 | Kind 2 | Kind 1 | Kind 2 | Kind 1 | Kind 2 | Kind 1 | Kind 1 |
| Inorganic compound filler | Kind 2 | Kind 1 | Kind 1 | Kind 3 | Kind 1 | Kind 1 | Kind 2 | Kind 1 |
| Amount inorganic compound filler (wt %) | 3 | 0.005 | 1 | 10 | 0.001 | 3 | 0.005 | 3 |
| Amount of zinc dithiocarbamate (wt %) | 1 | 0.25 | 5 | 10 | 0.05 | 1 | 0.05 | 2 |
| Mixture consistency | No. 2 | No. 2 | No. 2 | No. 2 | No. 2 | No. 2 | No. 2 | No. 2 |
| Rapid acceleration and deceleration test (Comparative Example 1 = 1) | 25 | 20 | 22 | 16 | 18* | 14 | 13* | 12 |

| | Comparative Example No. | | | | |
|---|---|---|---|---|---|
| | 1 | 2 | 3 | 4 | 5 |
| Extender composition | Formulation 8 | Formulation 1 | Formulation 2 | Formulation 3 | Formulation 8 |
| Amount ot extender (wt %) | 15 | 20 | 30 | 13 | 15 |
| Kind ot base oil | Kind 1 | Kind 1 | Kind 2 | Kind 1 | Kind 1 |
| Inorganic compound filler | — | — | Kind 1 | — | Kind 1 |
| Amount of inorganic compound filler (wt %) | — | — | 0.005 | — | 1 |
| Amount of zinc dithiocarbamate (wt %) | — | — | — | 0.25 | — |
| Mixture consistency* | No. 2 | No. 2 | No. 2 | No. 2 | No. 2 |
| Rapid acceleration and deceleration test (Comparative Example 1 = 1) | 1 | 3 | 4 | 3 | |

*Some of the samples of Examples 5 and 7 underwent seizing before peeling and thus was no longer subjected to testing.
*No. 2 in the Mixture consistency is defined in the item "Penetration No." in JIS K 2220.

As is apparent from the results of Table 5, the grease compositions of the examples of the present invention, which comprises an inorganic compound filler and a zinc dithiocarbamate incorporated therein, take far much time to reach peeling as compared with the grease compositions which contain no these components or contain either of these components incorporated therein and hence exhibit an excellent peeling resistance.

FIG. 1 illustrates the zone effective for the prevention of peeling and the zone where seizing life is reached, determined from the relationship between the concentration of zinc dithiocarbamate required for the prevention of peeling in the present invention determined by the foregoing rapid acceleration and deceleration test and the amount of an inorganic compound filler (MgO having an average particle diameter of 1 $\mu$m is used) added to strengthen the gel structure formed by an extender.

In accordance with FIG. 1, the zone surrounded by the added amount of zinc dithiocarbamate ranging from 0.05 to 10% by weight and the amount of inorganic compound filler ranging from 0.001 to 10% by weight is a zone where neither peeling nor seizing occurs (according to comparison of life). This zone contains an even more desirable zone surrounded by the added amount of zinc dithiocarbamate ranging from 0.25 to 5% by weight and the amount of inorganic compound filler ranging from 0.005 to 1% by weight.

Figure 2:
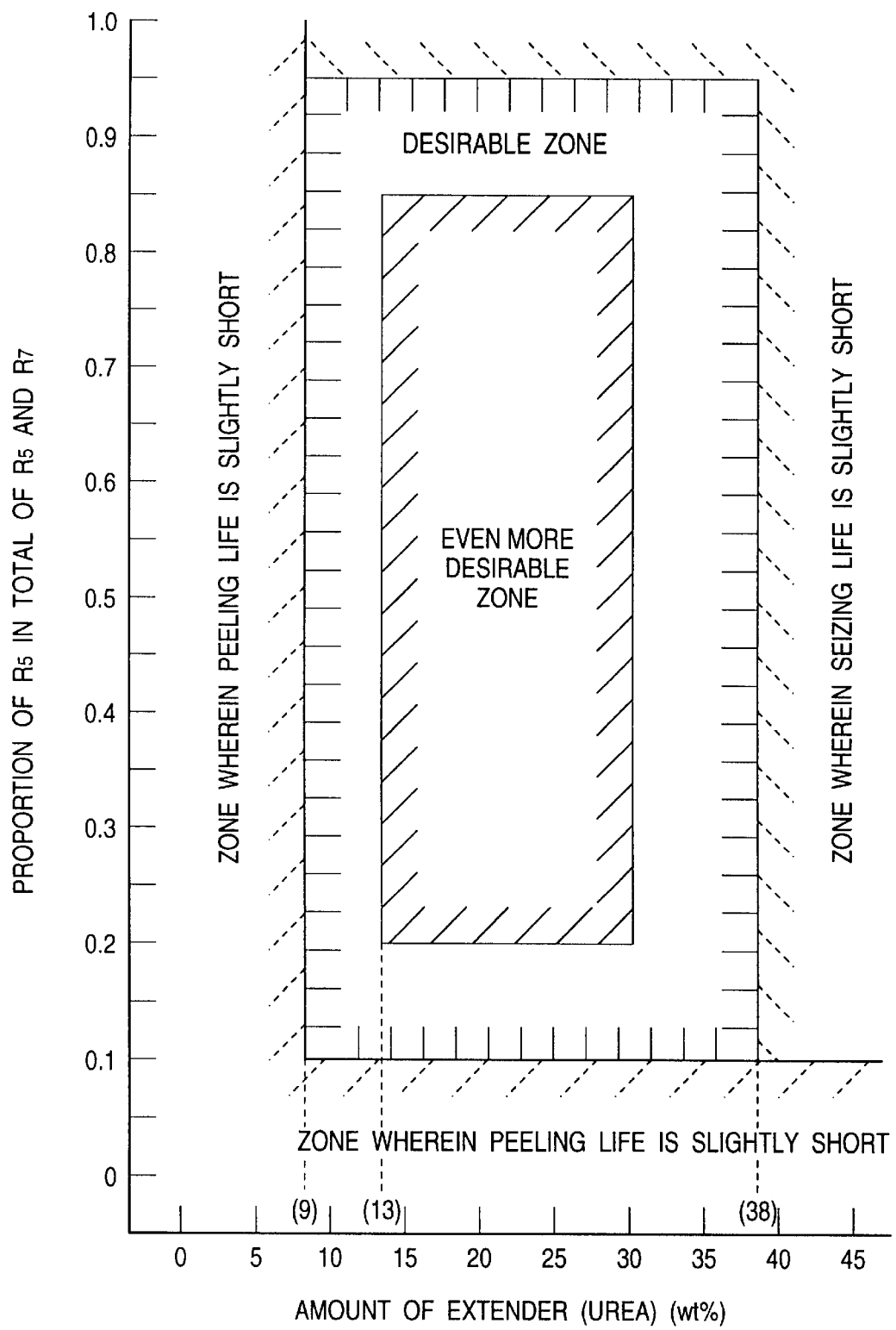
FIG. 2 is a graph illustrating the relationship between the amount of extender and the ratio of the number of $R_5$ in the total number of $R_5$ and $R_7$ of diurea wherein a zone effective for the prevention of peeling and prolongation of seizing life is shown.

Similarly, the relationship between peeling and seizing of bearing was determined from the desired composition and added amount of extender (diurea) in the foregoing rapid acceleration and deceleration test. The data are shown in FIG. 2. In FIG. 2, the numbers on the ordinate indicate the ratio of the number of $R_5$ in the total number of $R_5$ and $R_7$ ($R_5/(R_5+R_7)$) as an example of extender made of diurea compound. This ratio means the fluidity of grease. The greater this value is, the lower is the fluidity of grease and the more easily can occur seizing. On the contrary, the smaller this value is, the higher is the fluidity of grease and the more easily can occur grease leakage. The numbers on the abscissa indicate the amount of an extender (e.g., urea) used to form a gel structure.

As is apparent from the results of Table 2, the zone surrounded by the amount of extender ranging from 9 to 38% by weight and the ratio of $R_5/(R_5+R_7)$ ranging from 0.1 to 0.95 is a zone suitable for the elimination of disadvantages such as peeling and seizing. In particular, the zone surrounded by the amount of extender ranging from 13 to 30% by weight and the ratio of $R_5/(R_5+R_7)$ ranging from 0.2 to 0.85 is a zone where the durability life of bearing can be prolonged because of proper gelation and fluidity.

EFFECT OF THE INVENTION

As mentioned above, in accordance with the present invention, a grease composition for rolling bearing extremely excellent in peeling resistance can be obtained. The grease composition for rolling bearing according to the present invention is suitable particularly for rolling bearings mounted in automobile electrical parts or engine auxiliary machinery such as alternator, car air conditioner solenoid clutch, interpulley, electric fan motor and water pump.

While the invention has been described in detail and with reference to specific embodiments thereof, it will be apparent to one skilled in the art that various changes and modifications can be made therein without departing from the spirit and scope thereof.

What is claimed is:

1. A grease composition for a rolling bearing used in an engine auxiliary machinery, comprising a base oil, an extender, an inorganic compound-based filler and zinc dithiocarbamate, wherein said inorganic compound-based filler is spherical, has an average particle diameter of not more than 2 μm and comprises at least one particulate material selected from the group consisting of $Al_2O_3$, MgO, $TiO_2$ and diamond; the content of said inorganic compound-based filler is from 0.001% to 10% by weight based on the total weight of the composition; said zinc dithiocarbamate is a compound represented by the following formula (1):

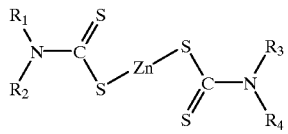

(1)

wherein $R_1$ to $R_4$ each represents a $C_{1-18}$ hydrocarbon group, and is present in a content of from 0.05 to 10% by weight based on the total weight of the composition; and said extender is a diurea compound represented by the following formulae (2) to (4):

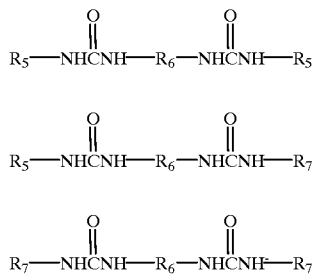

wherein $R_5$ represents $C_{6-12}$ aromatic ring-containing hydrocarbon group; $R_6$ represents a $C_{6-15}$ divalent aromatic ring-containing hydrocarbon group; and $R_7$ represents a cyclohexyl group or $C_{7-12}$ alkylcyclohexyl group, and the content of said diurea compound is from 9 to 38% by weight based on the total weight of the composition.

2. The grease composition for a rolling bearing used in an engine auxiliary machinery as in claim 1, wherein said inorganic compound-based filler has an average particle diameter of not more than 0.2 μm.

3. The grease composition for a rolling bearing used in an engine auxiliary machinery as in claim 1, wherein the content of said inorganic compound-based filler is from 0.005% to 1% weight based on the total weight of the composition.

4. The grease composition for a rolling bearing used in an engine auxiliary machinery as in claim 1, wherein the content of said inorganic compound-based filler is from 0.005% to 1.0% by weight based on the total weight of the composition, and the content of said zinc dithiocarbamate is from 0.25% to 5.0% by weight based on the total weight of the composition.

5. The grease composition for a rolling bearing used in an engine auxiliary machinery as in claim 1, wherein said extender is a diurea compound represented by the following formulae (2) to (4):

wherein $R_5$ represents a $C_{16-12}$ aromatic ring-containing hydrocarbon group; $R_6$ represents a $C_{6-15}$ divalent aromatic ring-containing hydrocarbon group; and $R_7$ represents a cyclohexyl group or $C_{7-12}$ alkylcyclohexyl group, and the proportion of mols of $R_5$/(mols of $R_5$+mols of $R_7$) is from 0.10 to 0.95, and the content of said diurea compound is from 9 to 38% by weight based on the total weight of the composition.

6. The grease composition for a rolling bearing used in an engine auxiliary machinery as in claim 1, wherein said extender is a diurea compound represented by the following formulae (2) to (4):

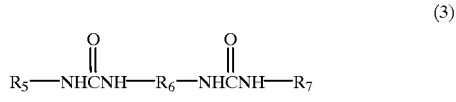

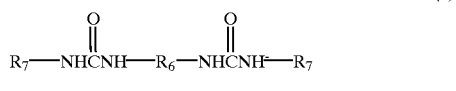

wherein $R_5$ represents a $C_{6-12}$ aromatic ring-containing hydrocarbon group; R6 represents a $C_{6-15}$ divalent aromatic ring-containing hydrocarbon group; and $R_7$ represents a cyclohexyl group or $C_{7-12}$ alkylcyclohexyl group, and the proportion of mols of $R_5$/(mols of $R_5$+mols of $R_7$) is from 0.02 to 0.85, and the content of said diurea compound is from 3 to 30% by weight based on the total weight of the composition.

7. The grease composition for a rolling bearing used in an engine auxiliary machinery as in claim 1, wherein said grease composition for a rolling bearing is used for engine auxiliary machinery.

8. A method for greasing a roller bearing, comprising the steps of:

applying a grease composition to the roller bearing, wherein the greasing composition comprises a base oil, an extender, an inorganic compound-based filler and zinc dithiocarbamate, wherein said inorganic compound-based filler is spherical, has an average particle diameter of not more than 2 μm and comprises at least one particulate material selected from the group consisting of $Al_2O_3$, MgO, $TiO_2$ and diamond; the content of said inorganic compound-based filler is from 0.001% to 10% by weight based on the total weight of the composition; said zinc dithiocarbamate is a compound represented by the following formula (1):

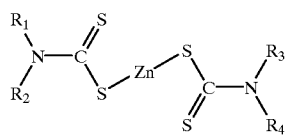
(1)

wherein $R_1$ to $R_4$ each represents a $C_{1-18}$ hydrocarbon group, and is present in a content of from 0.05 to 10% by weight based on the total weight of the composition; and said extender is a diurea compound represented by the following formulae (2) to (4):

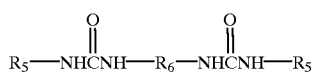
(2)

(3)

(4)

wherein $R_5$ represents $C_{6-12}$ aromatic ring-containing hydrocarbon group; $R_6$ represents a $C_{6-15}$ divalent aromatic ring-containing hydrocarbon group; and $R_7$ represents a cyclohexyl group or $C_{7-12}$ alkylcyclohexyl group, and the content of said diurea compound is from 9 to 38% by weight based on the total weight of the composition.

9. The method as in claim 8, further comprising the step of mounting the roller bearing to an engine auxiliary machinery.

10. The method as in claim 8, wherein said inorganic compound-based filler has an average particle diameter of not more than 0.2 μm.

11. The method as in claim 8, wherein the content of said inorganic compound-based filler is from 0.005% to 1.0% by weight based on the total weight of the composition.

12. The method as in claim 8, wherein the content of said inorganic compound-based filler is from 0.005% to 1.0% by weight based on the total weight of the composition, and the content of said zinc dithiocarbamate is from 0.2 5% to 5.0% by weight based on the total weight of the composition.

13. The method as in claim 8, wherein said extender is a diurea compound represented by the following formulae (2) to (4):

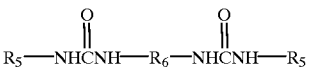
(2)

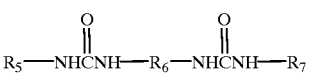
(3)

(4)

wherein $R_5$ represents a $C_{6-12}$ aromatic ring-containing hydrocarbon group; $R_6$ represents a $C_{6-15}$ divalent aromatic ring-containing hydrocarbon group; and $R_7$ represents a cyclohexyl group or $C_{7-12}$ alkylcyclohexyl group, and the proportion of mols of $R_5$/(mols of $R_5$+mols of $R_7$) is from 0.10 to 0.95, and the content of said diurea compound is from 9 to 38% by weight based on the total weight of the composition.

14. The method as in claim 8, wherein said extender is a diurea compound represented by the following formulae (2) to (4):

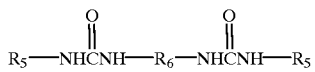
(2)

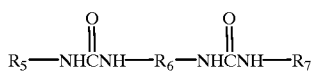
(3)

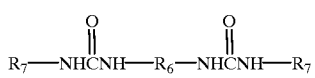
(4)

wherein $R_5$ represents a $C_{6-12}$ aromatic ring-containing hydrocarbon group; $R_6$ represents a $C_{6-15}$ divalent aromatic ring-containing hydrocarbon group; and $R_7$ represents a cyclohexyl group or $C_{7-12}$ alkylcyclohexyl group, and the proportion of mols of $R_5$/(mols of $R_5$+mols of $R_7$) is from 0.02 to 0.85, and the content of said diurea compound is from 3 to 30% by weight based on the total weight of the composition.

15. The method as in claim 9, wherein the engine auxiliary machinery is selected from the group consisting of an alternator, a solenoid clutch for a car air conditioner, an interpulley, an electric fan motor and a water pump.

* * * * *